United States Patent [19]

Pohjola

[11] Patent Number: 4,936,639
[45] Date of Patent: Jun. 26, 1990

[54] APPARATUS IN A TURNING-TRACK TRACK-LAYING VEHICLE

[75] Inventor: Jorma Pohjola, Oulu, Finland
[73] Assignee: Reta-Myynti Ky, Finland
[21] Appl. No.: 235,875
[22] PCT Filed: Dec. 18, 1986
[86] PCT No.: PCT/FI86/00153
  § 371 Date: Aug. 16, 1988
  § 102(e) Date: Aug. 16, 1988
[87] PCT Pub. No.: WO88/04626
  PCT Pub. Date: Jun. 30, 1988
[51] Int. Cl.$^5$ .............................................. B62D 55/30
[52] U.S. Cl. ........................................ 305/10; 305/16; 305/24; 180/9.44
[58] Field of Search ................... 305/16, 10, 17, 18, 305/21, 22, 24, 27, 28, 29, 30, 60; 180/9.1, 9.44, 9.46

[56] References Cited

U.S. PATENT DOCUMENTS

| | | |
|---|---|---|
| 2,277,855 | 3/1942 | Mercier ............................ 305/22 X |
| 3,934,664 | 1/1976 | Pohjola . |
| 3,938,607 | 2/1976 | Pohjola . |
| 3,948,331 | 4/1976 | Esch ................................ 305/28 |
| 4,046,429 | 9/1977 | Pohjola . |
| 4,051,914 | 10/1977 | Pohjola . |
| 4,119,356 | 10/1978 | Pohjola . |
| 4,188,076 | 2/1980 | Pohjola . |
| 4,325,443 | 4/1982 | Fischer et al. ................. 180/9.44 X |
| 4,453,611 | 6/1984 | Stacy, Jr. . |
| 4,501,452 | 2/1985 | Huang . |

FOREIGN PATENT DOCUMENTS

| | | |
|---|---|---|
| 1755276 | 10/1971 | Fed. Rep. of Germany . |
| 46708 | 2/1973 | Finland . |
| 51673 | 7/1974 | Finland . |
| 51308 | 8/1976 | Finland . |
| 1118661 | 6/1956 | France . |
| 0089480 | 5/1983 | Japan .......................... 180/9.44 |
| 189169 | 4/1964 | Sweden . |
| 0677979 | 8/1979 | U.S.S.R. ........................ 305/22 |
| 1368220 | 1/1988 | U.S.S.R. ........................ 305/21 |

Primary Examiner—Russell D. Stormer
Attorney, Agent, or Firm—Steinberg & Raskin

[57] ABSTRACT

The present invention relates to improving the stability of a turning-track track-laying vehicle such as a snowmobile. The vehicle comprises such a track belt (10), whose one edge can be stretched and whose other edge can be contracted by turning the end roll (14) or rolls (14, 15) which guide the track belt (10) so that the track belt (10) can be bent to a curved position in order to steer the vehicle. The bottom run of the track belt (10) loop is, in front of the crosswise gravity center plane (A—A) seen in the principal driving direction (E) of vehicle, pressed or weighted against the driving surface, particularly against soft snow (L—L), in such a way that, due to and in the region of said weighting, such a limited area (P33) of surface pressure higher than the average is created in which the maximum surface pressure (pmax, p2) is substantially higher than the average surface pressure (p1) in the rear section of the bottom run of the track belt.

15 Claims, 4 Drawing Sheets

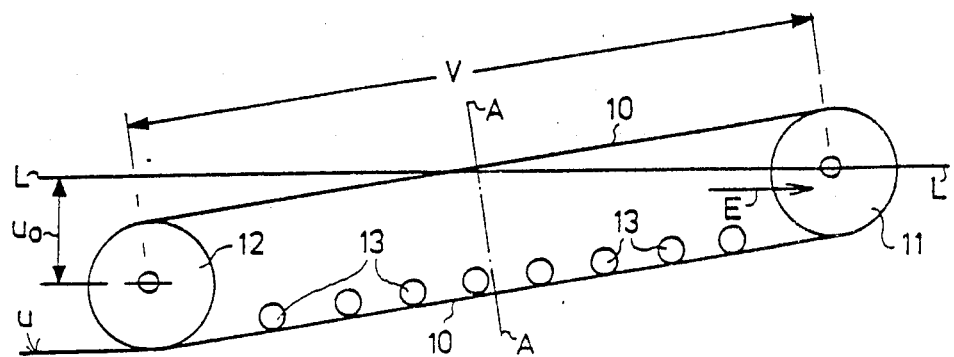
FIG. A  PRIOR ART
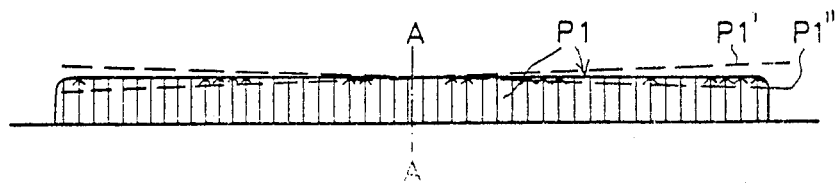
FIG. B  PRIOR ART
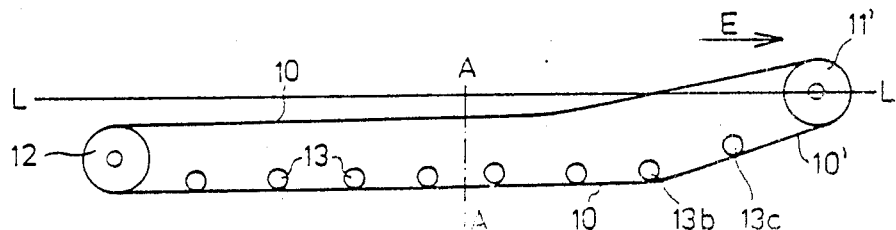
FIG. C  PRIOR ART
FIG. D  PRIOR ART

APPARATUS IN A TURNING-TRACK TRACK-LAYING VEHICLE

BACKGROUND OF THE INVENTION

The present invention relates to improving the stability of a turning-track track-laying vehicle such as a snowmobile, in which vehicle such a track belt is used whose one edge can be stretched and whose other edge contracted by turning the end roll or rolls which guide the track belt so that the track belt can be bent to a curved position in order to steer the vehicle.

U.S. Pat. Nos. 3,934,664; 4,046,429; 3,938,607; 4,051,914; 4,119,356; and 4,188,076 and Finnish Patent Nos. 46708 and 51308 to the inventor describe turning-track track-laying vehicles and track belts used in such vehicles.

The object of the present invention is to further develop the turning-track vehicle known from patents mentioned above.

A turning-track vehicle is superior to snowmobiles or similar equipped with skis in that it is able to move in off-the-road conditions in the summer as well as in the winter.

A drawback of a turning-track vehicle has, when driving in soft snow, been that the vehicle is sideways unstable and unsteady, because it presses (treads) snow under its track in an obliquely upward direction, which means that, particularly at higher speeds, the variations in the properties of snow and various dynamic forces make the vehicle run unstably and particularly rock sideways. The first idea that may occur in order to avoid this drawback is that the center of gravity is placed as far front as possible. The results of this arrangement are not satisfying in practice, as the vehicle will dive into the snow even in the smallest mound. The same will happen when slowing down the vehicle.

In the known snowmobiles equipped and steered with skis said problems have been avoided by suitably locating and weighting the skis.

SUMMARY OF THE INVENTION

The object of the present invention is to afford an improvement to drawbacks listed above.

In order to attain the aforedescribed objects and other hereinafter set forth, the principal characteristic feature of the invention is that the bottom run of the track belt loop is, in front of the crosswise gravity center plane seen in the principal driving direction of vehicle, pressed or weighted against the driving surface, particularly against soft snow, in such a way that, due to and in the region of said weighting, such a limited area of surface pressure higher than the average is created in which the maximum surface pressure is substantially higher than the average surface pressure in the rear section of the bottom run of the track belt.

A turning-track vehicle in accordance with the invention moves more steadily in snow, particularly in very soft snow; particularly the lateral stability is better due to the fact that in the front section of the track belt there is a region which is relatively strongly weighted by a weighting or treading roll assembly in accordance with the invention, which treads into snow a sufficiently deep track, along which the rear end of the track belt moves essentially without sinking at all.

A typical feature of how a turning-track vehicle in accordance with the invention moves is that in snow, even in very soft snow, its front end does not rise detrimentally higher than the other sections, which is caused by the more intensively weighted front section, and by the following section of the carrying surface of the track belt, located in front of the gravity center plane of the vehicle, to which a relatively small surface pressure is typical.

Regardless of whether one uses the invention or a track arrangement of the Prior Art, it is typical to both that how the track behaves on soft snow depends on the speed of the vehicle, because the effects of the inertial forces and lags related to treading vary depending on the velocity. It should also be emphasized that weighting in accordance with the invention can also be used in varying degrees, so that within the framework of the invention it is not always necessary to use a "full" weighting.

A weighting in accordance with the invention is mainly intended to be used in turning-track vehicles. In some cases it is also possible to use it in such track-laying vehicles in which there are two or more parallel track belts so that that the vehicle is made turn by means of speed differences between the track belts.

BRIEF DESCRIPTION OF THE DRAWINGS

The State of Art related to the invention and some preferred embodiments of the invention will now be described in detail, with reference to the figures of the accompanying drawings. In the drawings, FIG. A is a schematical illustration of how the track belt of a turning-track vehicle of the Prior Art functions on soft compressible snow;

FIG. B illustrates the variation of the carrying surface pressure between a track belt illustrated in FIG. A1 and the supporting snow surface;

Figure 1A:
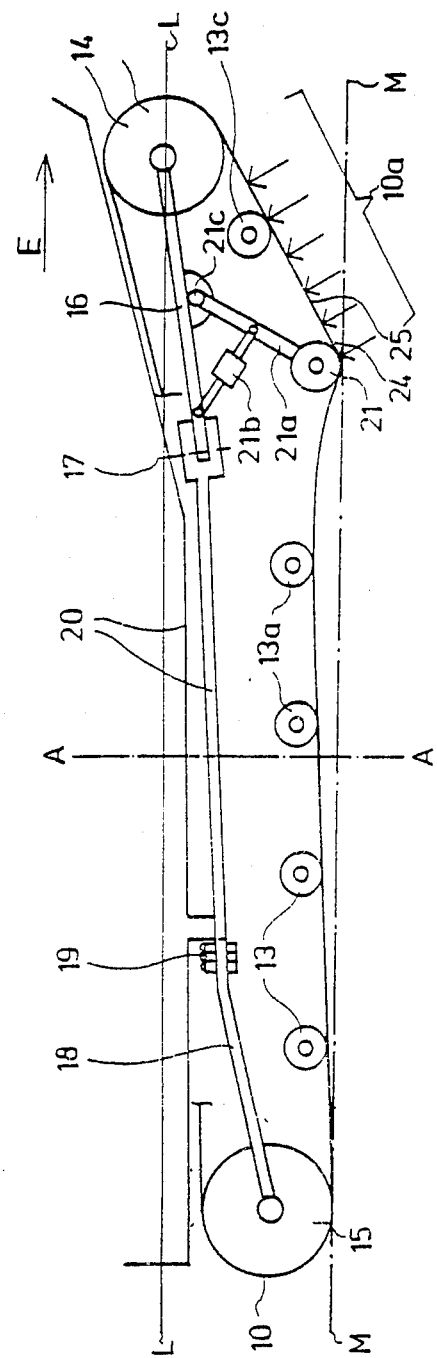
Figure 1B:
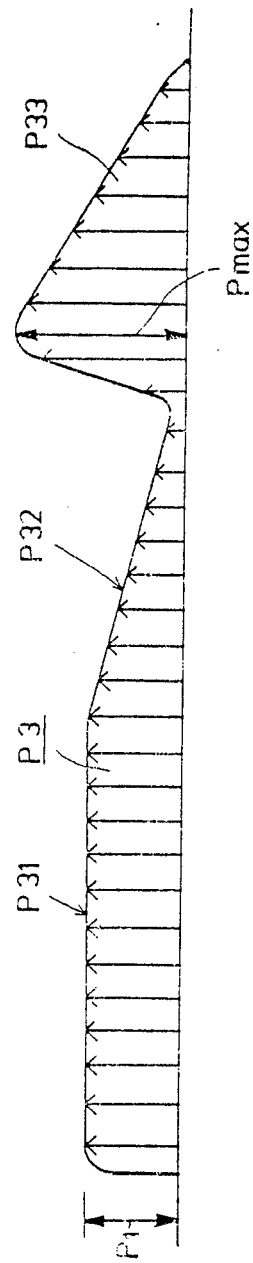
Figure 2:
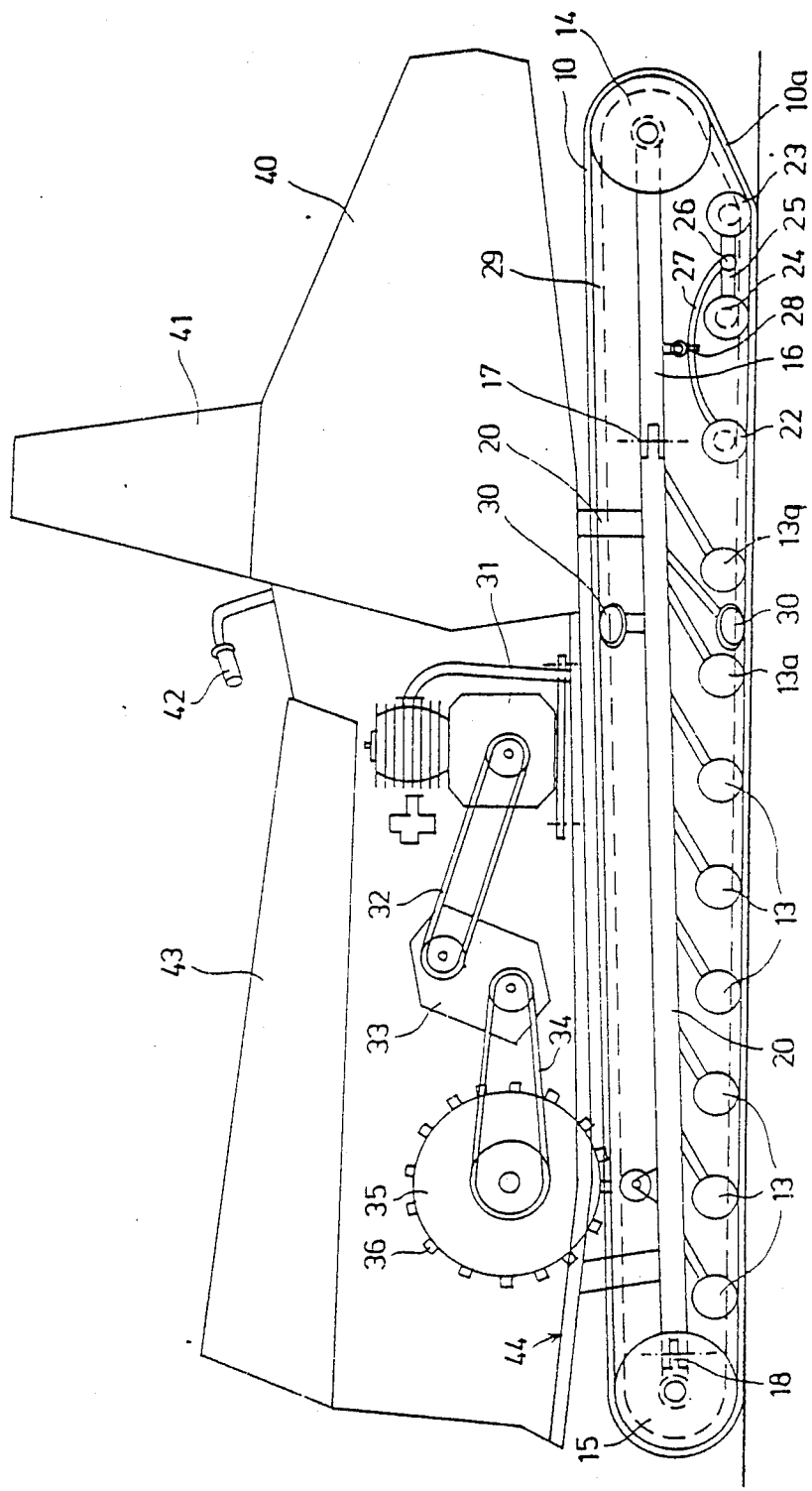
Figure 3:
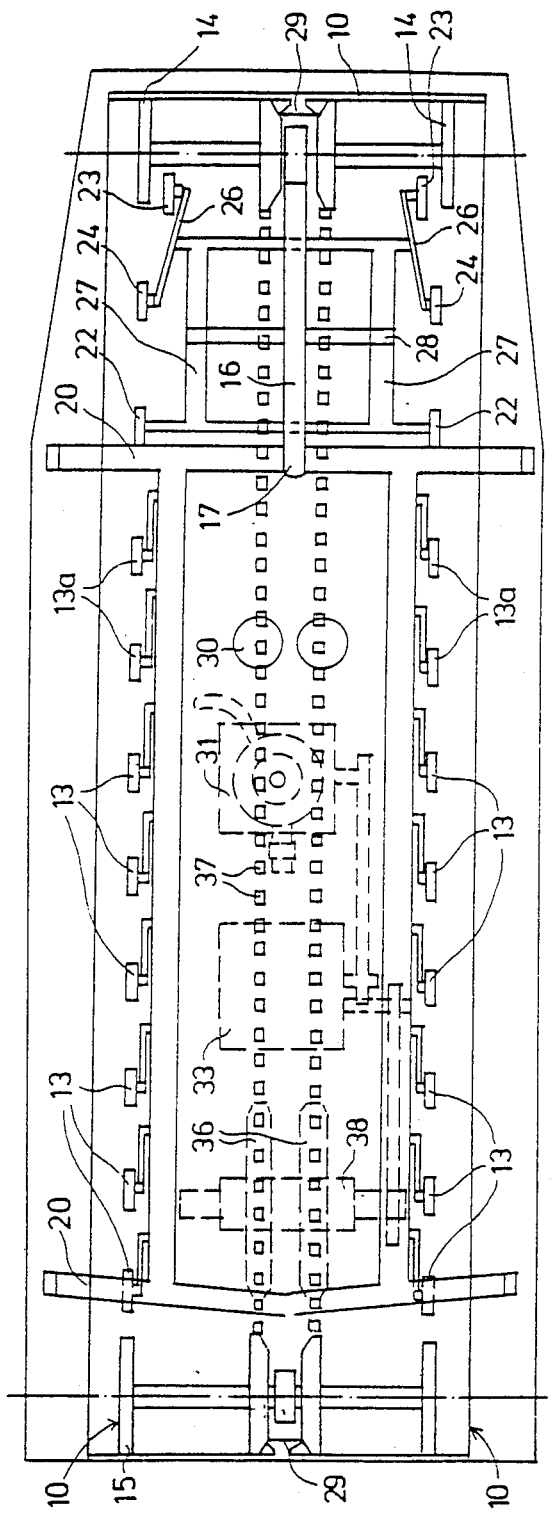

FIG. C shows such a known track belt, whose front-end idler roll is located higher than the rear-end idler roll;

FIG. D shows the distribution of the surface pressure between the track belt and the supporting snow surface when using a track belt shown in FIG. C;

FIG. 1A is a very schematic side view of a turning-track vehicle in accordance with the invention which is used;

FIG. 1B illustrates the surface pressure between the track belt and the soft snow when weighting system in accordance with the invention is used;

FIG. 2 is a more complete side view of an embodiment of a turning-track track-laying vehicle, in which such a front-end weighting arrangement is used which is different from what is shown in FIG. 1A;

FIG. 3 shows the same as FIG. 2, horizontally sectioned at the track belt; and

Figure 4:
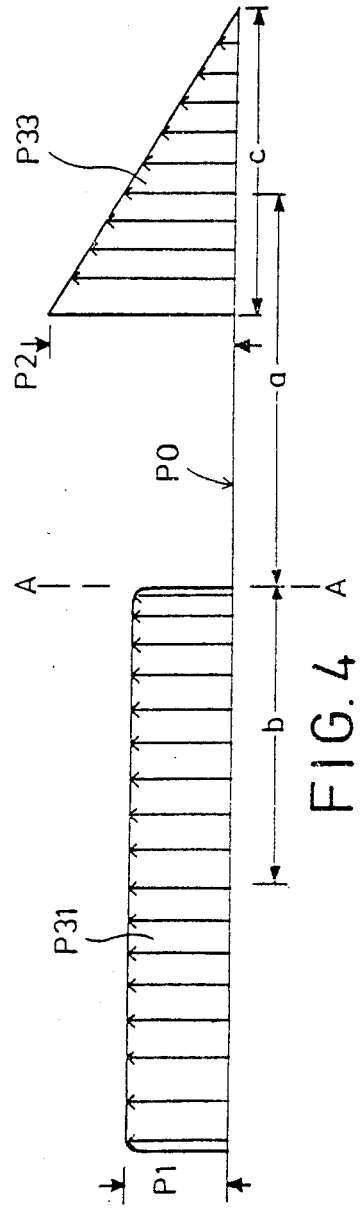

FIG. 4 shows schematically the general distribution of the surface pressure when using a method in accordance with the invention.

DESCRIPTION OF THE PREFERRED EMBODIMENTS

At first turning-track vehicles known in the Prior Art, and surface pressure distributions between them and soft snow, with reference to FIGS. A, B, C, and D will be described.

In accordance with FIG. A, a turning-track vehicle comprises for instance a track belt 10 resembling a track belt described in the Applicant's U.S. Pat. Nos. 3,934,664 and 4,046,429 or Finnish Patent No. 51308. The track belt is made to bend in a curvature for steering the vehicle by stretching one edge of the track belt and by contracting the other edge of the track belt. This curvature of the track belt 10 is provided by turning the end roll 11 or the end rolls 11 and 12 about an essentially upright axis by means of turning mechanisms known as such. On the bottom run of the track belt 10 there are bogie wheels 13 which support the bottom run of the track belt. As shown in FIG. A, the track belt runs on soft snow L—L in an obliquely upwards direction in such a way that the foremost end roll of the track belt is, to the extent of the sinking $U_o$ of the rear end, higher than the rearmost end roll 12. The distribution of the surface pressure between a track belt 10 shown in FIG. A and the soft snow is shown in FIG. B, in which the distribution $P_1$ illustrates the situation when the gravity center of the vehicle is located in the middle of its wheel base V in plane A—A. If the gravity center is in the front end of the vehicle, the surface pressure distribution resembles the one illustrated in FIG. B with phantom line $P_1'$, and if the gravity center is in the rear section of the vehicle, the surface pressure distribution resembles the one shown with phantom line $P_1''$.

As shown in FIG. C, in the bow or front of the track means moving to direction E there is an oblique part 10', created in such a way that the foremost idler roll 11' is positioned higher than the rearmost idler roll 12. The oblique bow 10' of the track means is guided by the bogie and idler wheels 13b and 13c.

The surface pressure distribution of a track belt illustrated in FIG. C resembles the one shown in FIG. D, in which distribution P2 there is, at the oblique run 10' of the track belt, a descending section P2'.

In the known track belts 10 illustrated in FIGS. A and C there is the above-mentioned drawback, which makes the track belt somewhat unstable particularly sideways, which also makes the vehicle rocky and unsteady.

FIG. 1A is a schematic illustration of a track-laying vehicle in accordance with the invention, in which the front end of the track belt 10 is specially weighted in order to eliminate the drawbacks discussed above. As illustrated in FIGS. 1A, 2, and 3, the track-laying vehicle comprises a frame section 20, to which bogie wheels 13, 13a are mounted with bearings in the way known as such, said boogie wheels supporting the bottom run of the track belt 10. The end rolls 14 and 15 of the track belt 10 are mounted with bearings to frame section 16 or 18, which are fastened by means of pivotal joints 17 or 19 to the frame section of the vehicle 20 in its upright-center plane in such a way that the end rolls 14 can be turned with joints 17 in order to make the track belt 10 curved for making the track-laying vehicle execute a turn. The rearmost end roll 15 is jointed with the upright joint 18 so that it is free to take the position determined by the track belt 10.

When driving a vehicle shown in FIG. 1A on soft snow L—L, the bogie wheels 21 or rolls are in the position shown in FIG. 1A, whereat the distribution P3 of the supporting surface pressure resembles the one shown in FIG. 1B. As shown in FIG. 1B, in the pressure surface distribution P3 there is, in the rear end of the track belt 20, a flat section P31, after which there is a declining part P32 at the bogie wheels 13a. As shown in FIG. 1A, the weighting wheels 21 or the similar weighting roll or ski is fastened to arms 21a, which are weighted with an adjustable spring element 21b, shown schematically. The spring element 21b is positioned between the turning frame section 16 and the arms 21a.

The arms 21a are, at their top ends, jointed to the frame section 16 by means of a horizontal joint 21c. The normal bogie wheel between the end roll 14 and the weighting wheel system 21 is indicated with ref. 13c. At the weighting wheels 21 in accordance with the invention there is a point where the surface pressure of the distribution P33, having a higher surface pressure, is at its maximum $P_{max}$. A consequence of the invention is that the area P33 (point 10a of the track belt 10), located in front of the gravity center level A—A, and more strongly weighted, works the driving track up essentially to its full depth in the bow M of the track belt, when driving in soft snow. The rear section of the track belt 10 runs on this prepared drive track substantially without sinking at all, which makes the track-laying vehicle run stably and steadily in soft snow.

The intensity and location of the weighting of the front section of the track belt 10 depend on the longitudinal location of the gravity center of the vehicle. If the gravity center plane is located in the rear part of the vehicle, the weighting must be more intensive, and the maximum pressure $p_{max}$ must be higher.

FIGS. 2 and 3 illustrate a more precise embodiment of a turning track vehicle and of a preferred weighting bogie design used in it. Those aspects of the design of the track-laying vehicle shown in FIGS. 2 and 3 which were not discussed above will be briefly described. The track belt 10 comprises, in its middle area, a laterally supported area 29 supported by lateral support wheels 30. The motor 31 of the track-laying vehicle drives, by means of chain 34, a gear transmission 33. The gear transmission 33 drives, by means of chain 34, the traction sprockets 35 installed on the shaft 38. The cogs 36 of the traction sprockets 35 drive, by means of opening sets 37 located on both sides of the lateral support area 29, the track belt 10.

As shown in FIG. 2, the track belt is, after the foremost end roll 14, arranged to be guided by a fixed bogey roll or wheels 13a, of which there may be, in the cross direction, several side by side.

In FIG. 2, a windshield 41 is fastened to the body 40 of the snowmobile. The handlebars 42 are connected to a steering mechanism known as such for turning the frame section 16. Behind the handlebars 42 there is a seat section 43, and on its both sides footrests 44.

As shown in FIGS. 2 and 3, in the turning frame section 16 of the front end of the vehicle there is, in order to implement the invention, an automatically functioning weighting bogey system, which provides the surface pressure distribution resembling the one illustrated in FIG. 4, in order to improve the lateral stability of the vehicle. This weighting bogie system comprises a frame section 27, which is fastened with horizontal joint shafts 28 to the turning frame section 16. In the front end of the frame section 27, bogie frames 25 are fastened by means of horizontal joint shafts 26, who have at their both ends bogie rolls or wheels 23 and 24. Similarly in the opposite end of the frame section 27 there are bogie wheels or rolls 22. By suitably choosing the lever distance between the bogie wheels 22 and the joint point 26 of the bogie frames 27 on one hand, and the lever distance between the joint point 26 of the bogie frames 25 and the joint point 28, the distribution maximum P33 and its maximum pressure $p_{max}$ ($p_2$ in FIG. 4) discussed above will be, according to known terms of equilibrium, placed at the latter bogie wheel 22.

The weighting of the front end of the track belt 10 may be provided with such a weighting bogie system in which the relationship of the weighting forces of different bogie wheels or rolls 22, 23, 24 is suitably arranged by appropriately selecting the length relationship of the lever arm between the points of application 25 of the articulation point 28 of the bogie frame 27 and of the bogie wheels 22, 23, 24.

The weighting bogie system 22–28 shown in FIG. 2 functions automatically in such a way that weighting in accordance with the invention is provided only when moving on a soft surface; when driving on a hard surface the surface forces the bogie wheels 22, 23 and 24 of the weighting bogie system into the same plane in which the other bogie wheels 13 and 13a are moving.

Such an adjusting mechanism (not shown) can be arranged in a vehicle in accordance with the invention in which the adjusting wheel is located in the cab of the track-laying vehicle or near the steering and control equipment in such a way that by turning the adjusting wheel one can continuously or discontinously adjust the position of the bogie system 21, 22, 24 so that it always works in the best possible way from the point of view of the driving conditions. This kind of adjusting mechanisms may be embodied in many ways.

The weighting method in accordance with the invention will now be discussed mathematically with reference to FIG. 4. In FIG. 4, the distribution of the surface pressure has been so reduced and idealized that it has, in the rear end of the track belt 10, a flat section P31, on which the surface pressure is constant $p_1$, and in the front end of the track belt 10, at the weighting bogie system in accordance with the invention, there is an substantially triangular surface pressure distribution P33, in which the maximum surface pressure is $p_2$, which, as described above, is located at the rearmost bogie wheel unit 22 (FIG. 2) or similar roll. In FIG. 4 it is assumed that the weight center of the vehicle is located in the front end of the area P31, in level A—A. The distance of the center plane of the area P31 from the plane A—A is indicated with b, and similarly the distance of the gravity center of the triangular area P33 from the plane A—A is indicated with a. In accordance with the invention, generally $p_2 >> p_1$. In equilibrium, the torques about the horizontal transverse weight center axis are equal to both directions, which can, using the notation of FIG. 4, be expressed with equation $p_1 \cdot L \cdot 2b^2 = p_2 \cdot L \cdot a \cdot c/2$ (L=width of track belt).

For practical reasons, the foremost end roll of the track belt 10 must in the invention be positioned higher than the rearmost end roll 15.

As stated above, the weighting method in accordance with the invention may in some cases be (secondarily) used in such track-laying vehicles, in which the turn is executed by, instead of bending the track belt, by means of speed differences between parallel track belts.

The weighting of the front end of the track belt 10 is provided with such fittings or adjusting mechanisms, i.e, weight elements, by which the weighting of the weight elements can be adjusted continuously or discontinuously. The weighting elements may also be positioned in such a location in which the weighting effect of the weighting bogie system is minimal or non-existent, for instance when driving on a hard surface such as on a road or off-road in no-snow conditions. Additionally, in the present invention, the track-laying vehicle may comprise at least two parallel, non-turning track belts, in which the vehicle is steered by speed difference between the parallel track belts. In the track-laying vehicle, the weighting influencing the front end of the bottom run of the track belts, may be provided.

Only some exemplary embodiments of weighting arrangements have been described in which the invention has been used. These arrangements may greatly vary, and even their designs may be very different from the above exemplary embodiments. In weighting bogey systems using the inventional idea one may use for instance adjustable springs for loading the weighting rolls, or wheels or similar friction elements.

The various details of the invention may vary within the inventional idea described above.

I claim:

1. Apparatus for improving the stability of a turning-track, track-laying vehicle such as a snowmobile, in which a track belt is used having one edge which can be stretched and another edge which can be contracted by turning at least one end roll thereof for guiding the track belt such that the track belt can be bent to a curved position in order to steer the vehicle,
    wherein a bottom run of the track belt loop is, in front of a cross-wise gravity center plane with respect to a principal driving direction of the vehicle, arranged to be pressed or weighted against a driving surface in a manner such that, in the region of such weighting, a limited area of surface pressure higher than average is created in which maximum surface pressure is substantially higher than average surface pressure in a rear section of a bottom run of the track belt behind said center gravity plane.

2. The combination of claim 1, wherein bogie wheels or rolls of the bottom run of the track belt are weighted such that after a maximum weighted area, there is a surface pressure area between the driving surface and the track belt in which the surface pressure is substantially lower than the maximum surface pressure provided by said weighting, and
    after said substantially lower surface pressure area, there is a bottom run of the track belt at which the bogie wheels are rolls are weighted such that a surface pressure is created between the driving surface and the track belt which is substantially constant, and in which area the surface pressure is substantially lower than the maximum surface pressure provided in the front area.

3. The combination of claim 2, wherein at least one bogie wheel or roll is mounted upon a frame of the vehicle by a lever articulatingly mounted upon the frame, said lever being adjustably weighted to generate said maximum surface pressure below said at least one bogie wheel or roll.

4. The combination of claim 3, additionally comprising an adjustable spraying element mounted both upon the vehicle frame and said lever for adjustably weighting said lever.

5. The combination of claim 4, wherein said vehicle frame is divided into pivotal sections such that end rolls around which the belt laps, can be turned when the vehicle is executing a turn,
    with said lever and spring element mounted upon a front frame section in the driving direction of the vehicle.

6. The combination of claim 2, additionally comprising a frame section arranged to join at least one pair of bogie rolls or wheels to a frame of the vehicle,
    wherein said frame section comprises at least one lever arm coupled to said vehicle frame at an articulation point thereof and to said at least one pair of bogie wheels or rolls, with said maximum surface pressure being controlled by selecting length of said at least one lever arm.

7. The combination of claim 6, wherein said at least one lever arm is curved.

8. The combination of claim 6, additionally comprising three bogie wheels or rolls coupled to said frame section, with a first one of said three rolls or wheels coupled to one end of said lever arm, a bogie frame coupled to said opposite end of said lever arm at a shaft thereof, and second and third ones of said bogie wheels or rolls coupled to said opposite ends of said bogie frame, wherein said maximum surface pressure is controlled by selecting length of said lever arm between said first one of said wheel/rolls and said bogie frame shaft, and length of said lever arm between said bogie frame shaft and said articulation point.

9. The combination of claim 8, wherein said vehicle frame is divided into pivotal parts such that end rolls around which the belt laps, can be turned when the vehicle is executing a turn, with said frame section coupled to a front frame part in the driving direction of the vehicle, and said bogie frame coupled to a forward end of said lever arm, and said first one of said bogie wheels/rolls coupled to a rear end of said lever arm.

10. The combination of claim 1, wherein the driving surface is constituted by soft snow.

11. The combination of claim 1, wherein weighting of the front end of the track belt is provided with at least one weight element which can be adjusted continuously or discontinuously, and which may also be positioned such that the weighting effect is minimal or non-existent when driving on a hard surface.

12. The combination of claim 1, additionally comprising at least two parallel, non-turning track belts, wherein the vehicle is steered by speed difference between the parallel track belts.

13. The combination of claim 2, wherein said substantially lower surface pressure area is arranged to decline in pressure from said substantially constant pressure area to said maximum pressure area.

14. The combination of claim 2, wherein a forward end of said substantially constant pressure area is situated at about the gravity center plane, pressure in said higher pressure area form a triangular distribution area decreasing towards the front of the vehicle, and there is no pressure between the maximum pressure and said substantially constant pressure region.

15. The combination of claim 2, wherein the pressure distribution generated is determined by the formula $$(p_1)(L)(2b^2) = (p_2)(L)(a)(c/2)$$

wherein $p_1$ = pressure of said substantially constant pressure region,

L = width of the track belt, $p_2$ = pressure of said forward higher pressure area, a = distance of a gravity center of said forward higher pressure area from said center gravity plane, b = distance of a center of said substantially constant region from the gravity center plane, and c = length of said forward higher pressure area in the driving direction.

* * * * *